(12) United States Patent
Fleisher et al.

(10) Patent No.: US 7,356,182 B1
(45) Date of Patent: Apr. 8, 2008

(54) METHOD AND APPARATUS FOR MEASURING IMAGE COMPLEXITY

(75) Inventors: Michael Fleisher, Sunnyvale, CA (US); Sachin Ahuja, Mountain View, CA (US); Adityo Prakash, Redwood Shores, CA (US); Edward R. Ratner, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 920 days.

(21) Appl. No.: 10/729,348

(22) Filed: Dec. 5, 2003
(Under 37 CFR 1.47)

Related U.S. Application Data

(60) Provisional application No. 60/431,377, filed on Dec. 6, 2002.

(51) Int. Cl.
*G06K 9/00* (2006.01)
(52) U.S. Cl. ..................................................... 382/171
(58) Field of Classification Search ...................... None
See application file for complete search history.

(56) References Cited

U.S. PATENT DOCUMENTS

| | | | | |
|---|---|---|---|---|
| 6,381,364 | B1 * | 4/2002 | Gardos | 382/173 |
| 6,560,354 | B1 * | 5/2003 | Maurer et al. | 382/131 |
| 6,832,002 | B2 * | 12/2004 | Baatz et al. | 382/173 |
| 7,031,517 | B1 * | 4/2006 | Le et al. | 382/173 |

* cited by examiner

*Primary Examiner*—Matthew C. Bella
*Assistant Examiner*—Alex Liew
(74) *Attorney, Agent, or Firm*—Okamoto & Benedicto LLP

(57) ABSTRACT

One embodiment of the invention pertains to a method of determining a measure of image complexity. An image is subdivided the image into a plurality of small image regions. Multiple statistical tests are performed to determine the similarity of a pair of adjacent image regions. If said pair passes the multiple statistical tests, then the pair of adjacent image regions are grouped together into one new region. The resulting merged regions may be weighted according to geometry and/or color variance, and the weights may be summed to produce an image complexity measure.

12 Claims, 11 Drawing Sheets

| A 402 | B 404 | B 406 | C 408 | C 410 | C 412 |
|---|---|---|---|---|---|
| A 414 | B 416 | B 418 | C 420 | C 422 | C 424 |
| A 426 | D 428 | D 430 | C 432 | C 434 | C 436 |
| A 438 | D 440 | E 442 | F 444 | G 446 | G 448 |
| A 450 | D 452 | E 454 | E 456 | G 458 | G 460 |
| A 462 | A 464 | A 466 | A 468 | A 470 | A 472 |

*Fig. 4c*

METHOD AND APPARATUS FOR MEASURING IMAGE COMPLEXITY

CROSS-REFERENCES TO RELATED APPLICATIONS

The present application claims the benefit of U.S. Provisional Application No. 60/431,377, entitled "Method and Apparatus for Measuring Image Complexity," filed Dec. 6, 2002, by Michael Fleisher, Sachin Ahuja, Adityo Prakash, and Edward R. Ratner, the disclosure of which is hereby incorporated by reference.

The present application is also related to the following:

U.S. patent application Ser. No. 09/550,705, filed Apr. 17, 2000 and entitled "Method and Apparatus for Efficient Video Processing," hereinafter 'Prakash I.' The disclosure of Prakash I has been published by the World Intellectual Property Organization under International Publication Number WO 00/64167 A1 with publication date Oct. 26, 2000.

U.S. patent application Ser. No. 09/591,438, filed Jun. 9, 2000 and entitled "Method and Apparatus for Digital Image Segmentation," hereinafter 'Prakash II.' The disclosure of Prakash II has been published by the World Intellectual Property Organization under International Publication Number WO 00/77735 A1 with publication date Dec. 21, 2000.

U.S. patent application Ser. No. 10/087,001 to Edward Ratner et al, filed Feb. 28, 2002, and titled "Dynamic Chain-Based Thresholding Using Global Characteristics" (hereinafter "Ratner I"). The disclosure of Ratner I has been published by the United States Patent and Trademark Office under Publication No. US-2002-0159638-A1 with publication date Oct. 31, 2002.

The disclosures of each of the above documents are hereby incorporated by reference.

REFERENCES CITED

Haris, K., Efstratiadis, S. N., Maglaveras, N., and Katsaggelos, A. K., "Hybrid Image Segmentation Using Watersheds and Fast Region Merging," *IEEE Trans. on Image Proc.*, Vol. 7, No. 12, pp. 1684-1698.

Horowitz, S. L. and Pavlidis, T., "Picture Segmentation by a Directed Split-and-Merge Procedure," In Proc. 2nd Int. Joint Conf. on Pattern Recognition, Copenhagen, pp. 424-433, 1974.

BACKGROUND OF THE INVENTION

1 Field of the Invention

The present invention relates generally to image and video processing and more particularly to determining the complexity of an image.

2 Description of the Related Art

In processing digital images or video for a variety of purposes, the notion of image complexity arises. While an encompassing definition of image complexity is elusive, it is conventionally described as a measure of the minimum description needed to capture the content of an image. As such, the concept is related to the idea of information content of an image, in the sense of information theory introduced by Claude Shannon, and yet more general.

The need to measure image complexity arises in a variety of contexts. For instance, an accurate image complexity metric can serve an important role in efficient image segmentation, allocation of bits during video compression, object tracking and computer vision, and automatic target recognition in military applications. Metrics proposed in the background art have included entropy, composite statistics such as standard deviation, $L^2$ error relative to the same image passed through a smoothing filter, edge counts, and gradient measures, among others. No metric has achieved acceptance as a ubiquitous standard, and most present a trade-off between computational ease and accuracy.

Image segmentation, in particular, presents a significant demand for an accurate complexity metric. Image segmentation refers to the process of subdividing an image into smaller regions or segments, preferably such that these segments correspond to individual objects or parts of objects depicted in the image. Segmentation can serve a variety of purposes, for example in identifying objects, in extracting image features from a scene, or in eliminating temporal redundancy to compress the data in a video sequence. The latter purpose is of particular importance as the rapid growth of digital media in the marketplace and the enormous size of typical raw video data have prompted a need to develop more efficient and more accurate methods for compressing these large video files. Background on the importance of video compression and the development of more efficient techniques can be found in the commonly assigned application referenced above as 'Prakash I'.

Temporal redundancy in video data is typically reduced by encoding a subset of frames as reference frames and by attempting to describe interspersed frames using predictions based on one or more of the reference frames. Since within a scene many of the same objects appear across multiple frames, the interspersed predicted frames can to a great extent be "built up" from constituent objects of one or more reference frame. Because motion may occur between frames, it becomes necessary to determine how much various objects are displaced between a reference frame and the predicted frame. The most common existing technologies for video compression, including the MPEG-1, MPEG-2, and MPEG-4 standards, break each predicted frame into a grid of square blocks (generally 16×16 pixels or 8×8 pixels) and search for square blocks in a reference frame that provide the best match for each of these blocks. In general, these blocks do not correspond to actual objects that move within the scene. As a result, block matches tend to be imprecise and motion is crudely approximated, requiring block-based algorithms to expend many additional bits to correct their inaccurate predictions. Compression strategies that subdivide images into segments representing actual objects, of arbitrary shape, allow for more faithful matching between frames and thus more accurate predictions. Higher compression ratios are thus possible. In fact, when accurate object-based segmentation is performed, the average number of segments needed to describe each frame for most video sequences is smaller than the number of small square blocks used in block-based algorithms, reducing the amount of motion information needed to encode the video. However, achieving accurate segmentation is a non-trivial task. A successful segmentation strategy is discussed in the commonly assigned application referenced above as 'Prakash II'.

A variety of other segmentation techniques have been contemplated in the academic literature. For example, S. L. Horowitz and T. Pavlidis present a split-and-merge method in "Picture Segmentation by a Directed Split-and-Merge Procedure," In Proc. 2nd Int. Joint Conf. on Pattern Recognition, Copenhagen, pp. 424-433, 1974. An image is subdivided via a quadtree structure when areas are not sufficiently homogeneous, and a merging step is alternately introduced to correct against over-splitting. K. Haris, S. N. Efstratiadis, N. Maglaveras, and A. K. Katsaggelos propose a hybrid technique using watershed subdivision followed by a merging step in "Hybrid Image Segmentation Using Watersheds and Fast Region Merging," *IEEE Trans. on Image Proc.*, Vol. 7, No. 12, pp. 1684-1698. For further information, more complete overviews of the main strategies for segmentation, including histogram techniques, edge-based techniques, region-based techniques, and hybrid methods, may be found in both 'Prakash II' and the K. Haris et al paper.

A fundamental issue that arises in image segmentation is how to determine how finely an image should be subdivided. For instance, the image may consist of a garden, and within the garden a plurality of plants, and within each plant a variety of flowers and leaves, and within each flower a plurality of petals, and within each petal and leaf a texture consisting of color variation, and so on. The objects contained in this image can be described at a number of levels. A successful segmentation strategy should identify distinct objects but should not subdivide the image so finely that no color or texture variations within segments are tolerated (otherwise the goal of efficient video compression, for example, may be undermined). Aside from the problem of scaling, further difficulties are presented by the fact that different images have different lighting levels, different color ranges, different contrast levels, and so on. Subtle color changes in one image sequence may demarcate distinct objects that move differently, while another sequence may consist of a few large objects, each textured with broad color fluctuations. Training a segmentation algorithm to automatically determine the threshold for subdivision given these variations in image characteristics presents a dilemma: it is hard to determine a threshold without knowing the number of objects in an image, and it is hard to determine the number of objects in an image without an accurate threshold. The application referenced above as 'Ratner I' discusses the importance of thresholding in the case of an edge-based segmentation strategy.

SUMMARY OF THE INVENTION

One embodiment of the invention pertains to a method of determining a measure of image complexity. An image is subdivided the image into a plurality of small image regions. Multiple statistical tests are performed to determine the similarity of a pair of adjacent image regions. If said pair passes the multiple statistical tests, then the pair of adjacent image regions are grouped together into one new region. The resulting merged regions may be weighted according to geometry and/or color variance, and the weights may be summed to produce an image complexity measure.

BRIEF DESCRIPTION OF THE DRAWINGS

A further understanding of the nature and the advantages of the invention disclosed herein may be realized by reference to the remaining portions of the specifications and the attached drawings.

FIG. 4c illustrates the resulting division of the image into block-based regions.

To aid in understanding, identical reference numerals have been used wherever possible to designate identical elements in the figures.

DETAILED DESCRIPTION OF THE SPECIFIC EMBODIMENTS

1 Introduction and Overview

Figure 1:
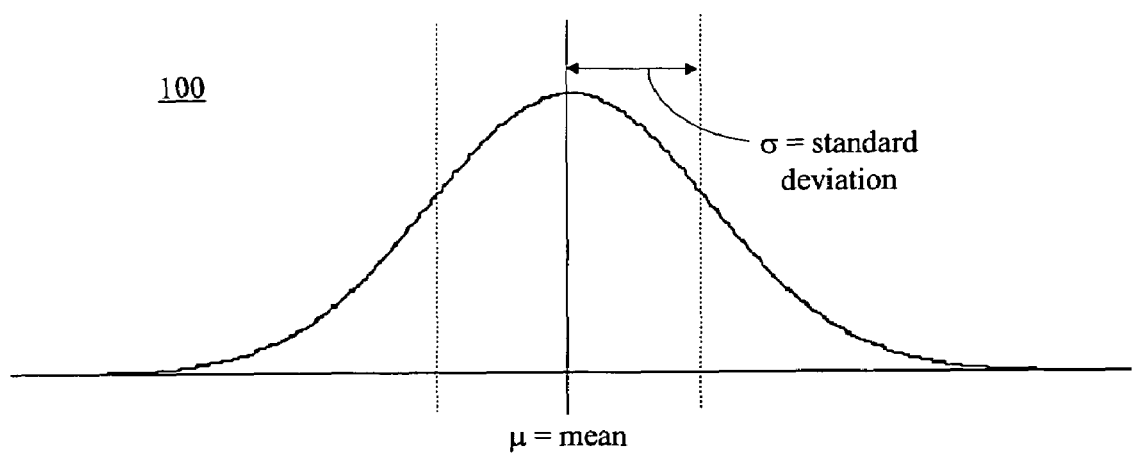
FIG. 1 illustrates a normal, or Gaussian, distribution.

An embodiment the present invention relates to a novel region-merging strategy followed by a weighted counting procedure to estimate the complexity of an image. The region-merging strategy is designed to combine image regions that are very similar in color statistics to create a rough estimate of the number of distinct regions in the image. Methods for merging regions to create an image segmentation exist in the related art, as seen for example in the paper by S. L. Horowitz and T. Pavlidis cited in the 'Description of the Related Art' section above. Over and above that reference, however, an embodiment of the present invention provides a new technique for region merging and it applies this technique to develop rough estimates of regions as part of the process of determining an image-wide estimate of complexity. The region-merging operation is thus designed to be significantly faster than segmentation processes disclosed in the prior art and to produce somewhat different results. Rather than determining precise boundaries, the disclosed method estimates the number and the size of objects contained in an image to produce a complexity measure as its output. As such, the disclosed method differs substantially from superficially related segmentation strategies found in the related art.

A new method and apparatus is disclosed for measuring the complexity of an image. While this complexity measure is relevant to a variety of applications, it is especially useful for guiding threshold choices during image segmentation. In particular, it solves the problem of estimating the number of segments or distinct regions in an image, from which estimate an appropriate threshold can be determined. As such, the present invention provides a significant advance in the field of object-based image and video compression.

In one embodiment of the invention, small areas within an image are merged according to statistical tests to determine a characteristic number of image regions. Statistical tests may include adapted versions of a t-test and an F-test for determining the likelihood that neighboring regions' pixel value distributions were drawn from the same parent distribution. Merging choices are made for neighboring regions during an efficient, single-pass raster scan. In another embodiment, multiple passes may be made. A novel counting procedure determines a complexity measure from the size and number of the resulting image regions. This counting procedure compensates for over-division that may occur near edges by reducing the weights for small image regions and for regions with high variance.

An embodiment of the present invention also provides an object-based system for encoding and decoding video data that employs the aforementioned method for measuring image complexity. Both an encoder and a decoder determine the complexity of image frames from a video sequence and use this complexity measurement to guide threshold choices during segmentation of the frames.

The remainder of the specification describes a preferred embodiment of the invention as well as some alternative embodiments in the context of a two-dimensional digital image comprised of an array of pixels, wherein a color value is associated to each pixel. For example, the image might be a 720 by 480 array of pixels with component values for each of several colors components associated to each pixel. One set of color components in common use is the YUV color space, wherein a pixel color value is described by the three components (Y,U,V), where the Y component refers to a grayscale intensity or luminance, and U and V refer to two chrominance components. Another common color space is the RGB color space, wherein R, G, and B refer to the Red, Green, and Blue color components, respectively. A variety of other color spaces may be used to express the image. The YUV space is used throughout the description to provide specificity of presentation, but this choice is not essential to the invention.

Note that the image being considered can be an image of a physical space or plane or an image of a simulated and/or computer-generated space or plane. In the computer graphic arts, a common image is a two-dimensional view of a computer-generated three-dimensional space (such as a geometric model of objects and light sources in three-space). An image can be a single image or one of a plurality of images that, when arranged in a suitable time order, form a moving image. Note that while two-dimensional image representations are discussed herein, the term image is not intended to be limited in dimensionality. In other embodiments the present invention may be applied equally well to images of other dimensionality. Neither is the term image intended to be limited to a digital image composed of an array of pixels. Any method of representing an image that enables measurement of image characteristics and subdivision into regions is consistent with the present invention. Furthermore, the image characteristics that are measured and used to determine image complexity are not limited to color values. Other quantities, such as depth, density, temperature, or any other measurable quantities that are spatially distributed, may be used by the disclosed invention to determine image complexity.

2 Detailed Description of the Drawings 2.1 Region Merging

The method for measuring complexity of an image begins by subdividing the image into a plurality of small constituent regions. Any method of subdivision may be used, but preferably the regions will be of uniform size and small enough to be smaller than image objects that are considered in determining complexity. In the preferred embodiment, the pixel array is subdivided into a regular grid consisting of four pixel by four pixel square blocks. In the preferred embodiment, objects that are smaller than this four by four size are deemed too small to be of interest in determining image-wide complexity.

Starting with this subdivision into small regions, the method proceeds to measure the statistical similarity of pairs of adjacent regions to test whether they should be merged into one larger region. A variety of statistical comparisons are consistent with the invention, but preferably the comparison should test the likelihood that the color distributions in the two regions belong to a distribution of consistent color values in a larger, engulfing region.

In the preferred embodiment, the mean and the variance are calculated for each image region and are used to calculate two statistics that are then used to determine whether two adjacent regions are sufficiently similar to be merged together. More specifically, adapted versions of the known F-test and t-test from sampling theory, described below, are used. In other embodiments, more than two statistical tests may be used, and different test from the ones described below may be used.

FIG. 1 illustrates a normal, or Gaussian, distribution 100. The center vertical line represents the mean value, or μ, for the distribution, and the distance between the center line and each dotted line is the standard deviation, or σ, which when squared yields the variance, $\sigma^2$. The standard deviation marks a distance from the mean within which a fixed percentage (approximately 68%) of the area under the curve lies. The variance thus provides a measure of the width, or spread, of the distribution.

In sampling from normally distributed data, the histogram for a sample will approach the shape of the Gaussian distribution as the sample size increases. However, for a fixed size sample, the shape of the histogram may in general differ from the parent Gaussian distribution. If two samples are taken from the same parent distribution, one can probabilistically expect a certain degree of variation in the means of the two samples. (In fact, the central limit theorem explains that if a large number of samples are taken, the distribution of the means for these samples will be Gaussian regardless of the parent distribution.)

Figure 2A:
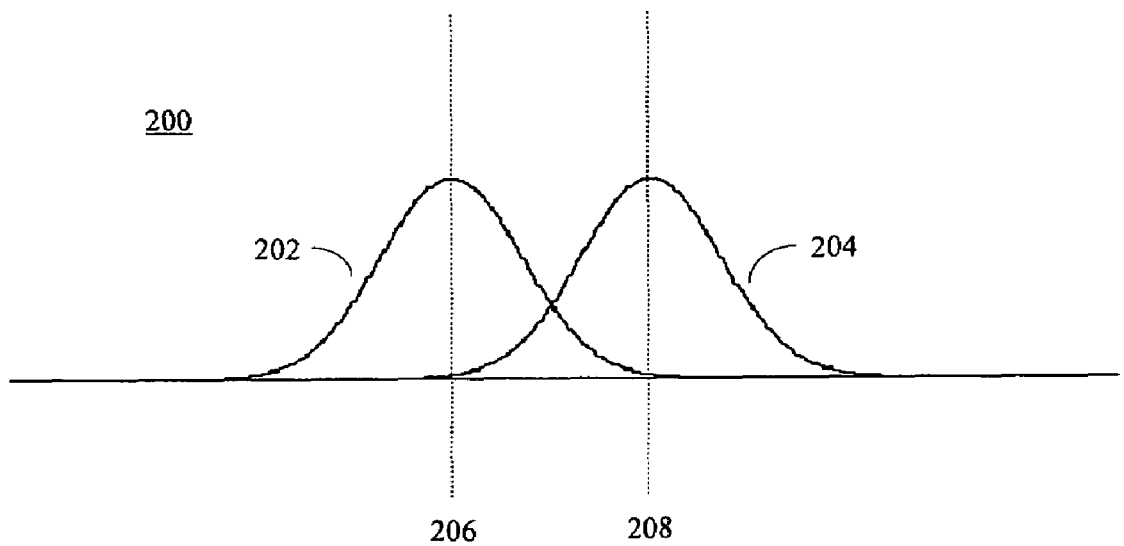
FIG. 2a illustrates two Gaussian distributions with different means and with small variances.
Figure 2B:
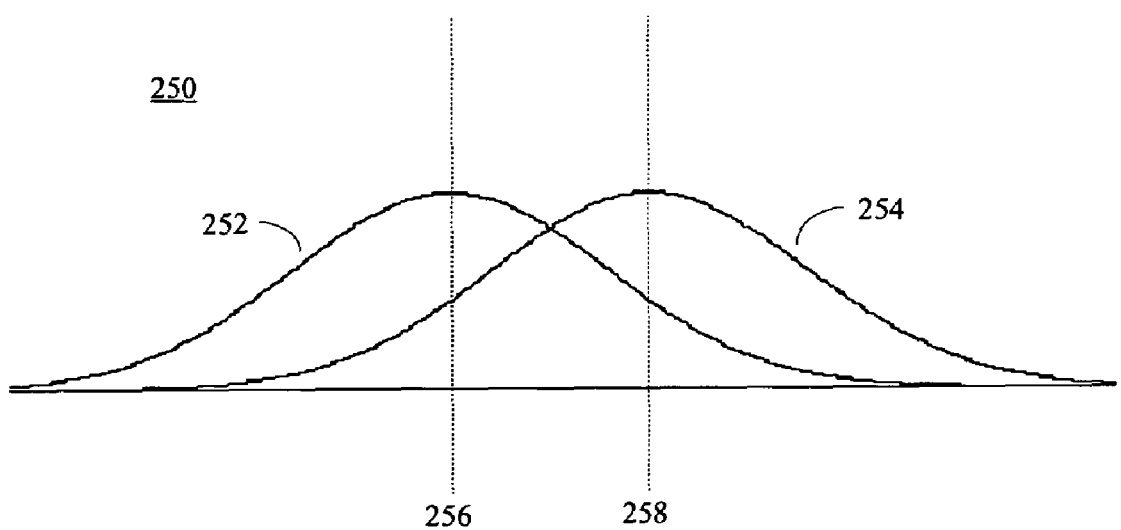
FIG. 2b illustrates two normal distributions with different means and with larger variances.

In determining whether regions should be merged, two data samples are compared and the question is asked: are these two samples likely to have been drawn from the same parent distribution? The answer to this question depends not only on the difference between the means of the two samples, but also on their variances (or spread). For instance, FIG. 2a illustrates two Gaussian distributions (202, 204) with different means (206, 208) and relatively small variances, while FIG. 2b illustrates two Gaussian distributions (252, 254) with different means (256, 258) but larger variances. The difference between the means represented by lines 206 and 208 and the difference between the means represented by lines 256 and 258 are equal, but the variances differ. The area of overlap between the distributions 252 and 254 is much greater than the overlap between 202 and 204. Hence, it is more likely that distributions 252 and 254 are sampled from the same parent distribution than that distributions 202 and 204 are. These figures are stylized examples since actual samples of finite size will not have such normally distributed data, but they illustrate the relationship between mean and variance in testing whether samples belong to the same parent distribution.

A first statistical test, sometimes called the F-test, measures whether two samples have similar variances (or, equivalently, standard deviations). Let $\sigma_1^2$ and $\sigma_2^2$ be the variances of the data for two image regions. In the preferred embodiment, it is determined whether the ratio of variances $$\frac{\max(\sigma_1^2, \sigma_2^2)}{\min(\sigma_1^2, \sigma_2^2)}$$

is below a threshold value F. If it is less than F, then the pair passes the test; otherwise the pair fails. In the standard statistical F-test, the threshold F varies according to the number of data points in each of the two samples. In the preferred embodiment, since all samples contain at least 16 data points from a single four by four block, for simplicity a constant threshold value F is used.

A second statistical test measures the difference between the means of two samples relative to their variances to determine whether the samples are likely to come from the same parent distribution. Let $\sigma_1^2$ and $\sigma_2^2$ be the variances of the data for two image regions, let $\mu_1$ and $\mu_2$ be the corresponding means, and let $n_1$ and $n_2$ be the corresponding sizes of the two samples. Then in the preferred embodiment, it is determined whether the quantity $$\frac{(\mu_1 - \mu_2)^2}{\left(\frac{n_1\sigma_1^2 + n_2\sigma_2^2}{n_1 + n_2}\right)\left(\frac{1}{n_1} + \frac{1}{n_2}\right)}$$

is below a threshold value t. If it is less than t, then the pair passes the test; otherwise, the pair fails. This second statistical test is similar to the known statistical t-test. In the standard statistical t-test, the threshold t varies according to the values of $n_1$ and $n_2$, but in the preferred embodiment a fixed threshold t is used for simplicity.

In the preferred embodiment, a pair must pass both the first and the second statistical tests in order to be merged. Preferably, these tests are performed on the Y luminance component of the color value for each pixel. In an alternative embodiment, all three (Y, U, V) components are used and three-dimensional versions of the two statistical tests are employed. In yet another embodiment, the Y, U, and V components are first combined using a weighted sum to form a scalar color value, and that scalar color value is used in the statistical tests. In still another embodiment, the RGB color space is used.

The first statistical test is first performed for a pair of regions. If the pair fails the first statistical test, then no merge occurs. If the pair passes the first statistical test, then the second statistical test is performed. If the pair fails the second statistical test, then no merge occurs. If the pair passes the second statistical test, then the two regions are merged together and relabeled as a single region.

In another embodiment, the two statistical tests can also be performed in parallel. In this case the two regions are merged only if they pass both statistical tests.

In the preferred embodiment, a raster scan is made through all of the four by four blocks in the image (from left to right, top to bottom), and merging decisions are made at each block during the scan. At each stage, the current block is compared to the block to the right and to the block below. Individual choices are made about whether to merge with each of these two blocks. If the current block has already merged with one of these neighbors, then that neighbor is excluded from consideration to save computation time. At each stage, regions are relabeled to reflect any merges that have occurred. By limiting comparisons to neighbors to the right and down at each stage, this process minimizes the number of comparisons made while guaranteeing that any two blocks sharing an edge have the opportunity to merge. As such, this process provides a very efficient merging strategy.

In an alternative embodiment, during the raster scan of blocks the current block is compared (whenever possible) with all four of its left, right, top, and down neighbors. In this embodiment, the current block is only merged with the best-matching adjacent block, assuming that pair passes both statistical tests (else no merging occurs). Since this selective procedure does not favor the formation of larger regions, the raster scan is iterated at least two times. Subsequent scans may proceed in raster order or from right to left, bottom to top.

When the process arrives at a given block, it may be the case that this block has already been merged with one or more others at a previous step. In this case, it may be useful to compare the statistics of the current block's adjacent blocks not with only the current block but with the entire region containing the current block. In one embodiment, the mean and variance data for each merged block is updated after a merge to provide composite statistics for the new, larger region within each of its constituent blocks. The mean and variance may be calculated directly or estimated using the known statistics for the blocks comprising the larger region.

Figure 3A:
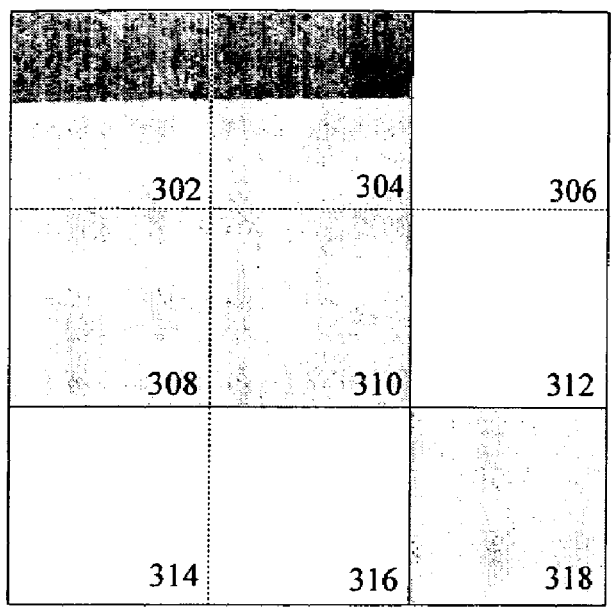
FIG. 3a illustrates a simplified image frame divided into nine square blocks.
Figure 3B:
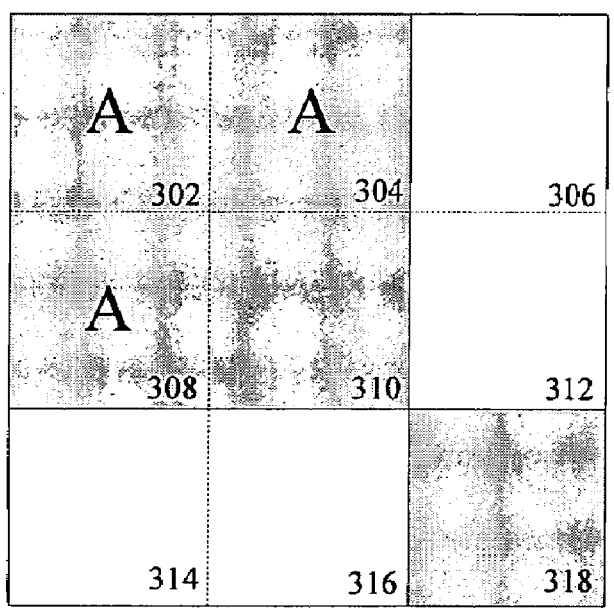
FIGS. 3b-3f illustrate the sequential steps of statistical block merging in raster-scan order.

FIGS. 3a-f illustrate the merging process of the preferred embodiment for a simple image, consisting of two gray squares and two white rectangles. Blocks 302, 304, 306, 308, 310, 312, 314, 316, and 318 represent the four pixel by four pixel blocks into which the image is subdivided. FIG. 3a shows the image divided into its constituent blocks. FIG. 3b shows the result of a first merging step. Block 302 is compared with block 304 and with block 308, its right neighbor and its bottom neighbor, respectively. Since all three blocks have identical color characteristics, all three are merged. These blocks 302, 304, and 308 are labeled with the letter "A" to denote that they belong to a single region.

Figure 3C:
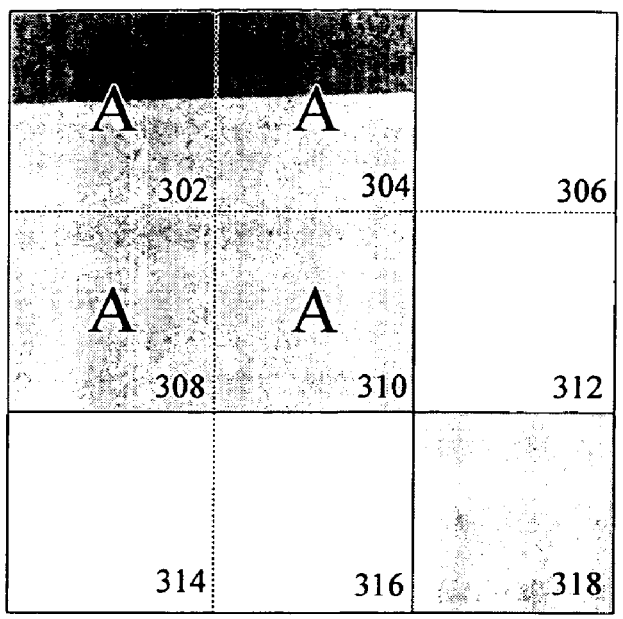

FIG. 3c shows the result of a second merging step. The next block in raster scan order, 304, is compared to its neighbors 306 and 310. Block 306 differs markedly from region A in color, so it is not merged with 304. Block 310, however, matches the color statistics for region A, so it is merged with block 304 to become part of region A.

Figure 3D:
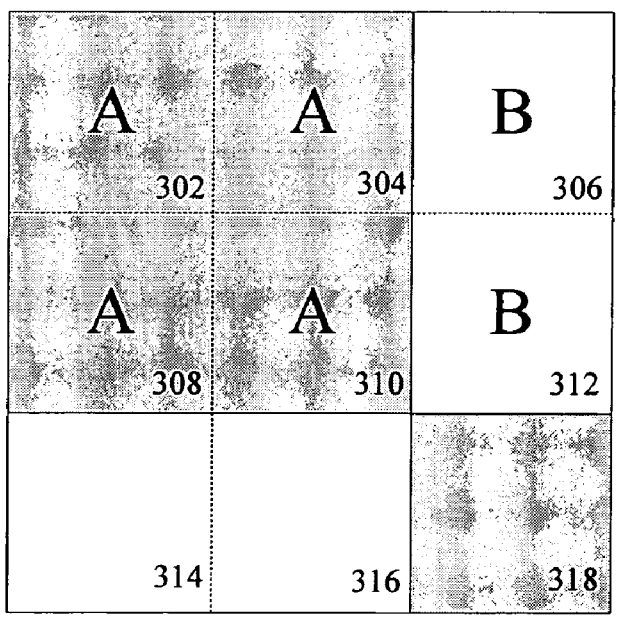

FIG. 3d shows the result of a third merging step. Block 306 is compared only to block 312 (since block 306 has no neighbor to the right). Since these two blocks have identical color statistics, they are merged to form a second region B.

As the raster scan proceeds through blocks 308, 310, and 312, no additional merges occur so the picture is unchanged.

Figure 3E:
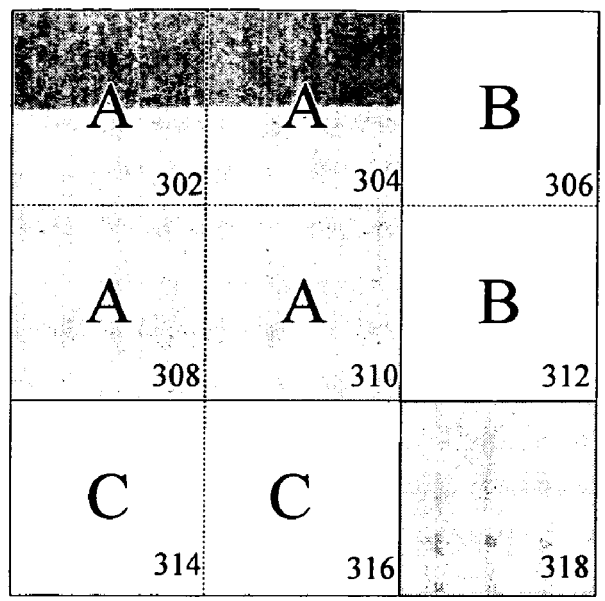

FIG. 3e shows the result of a seventh merging step. Block 314 is compared only to block 316 (since block 314 has no neighbor below). Since the color statistics for these two blocks are identical, they are merged to create a third region C. In the eighth step, no additional merging occurs so the picture is unchanged.

Figure 3F:
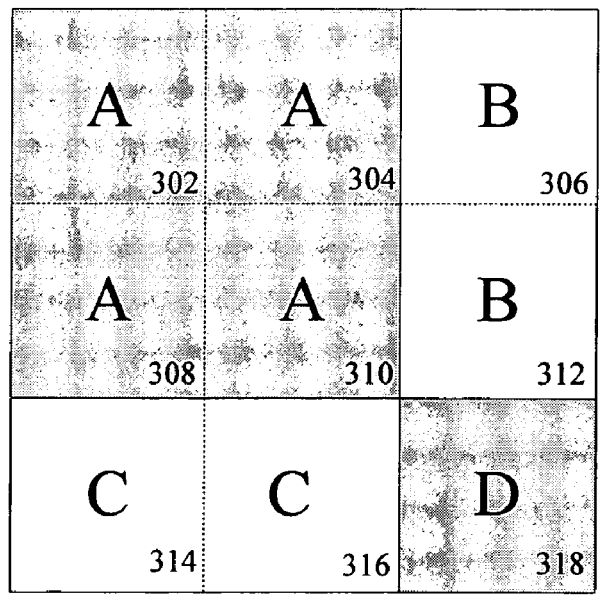

FIG. 3f shows the result of a ninth and final merging step. Block 318 cannot be compared to a block to the right or below, so no comparison must be made. However, since block 318 has not previously been merged with any other blocks, it is labeled as a fourth region D. Thus, FIG. 3f shows the result of the merging process. Every block is a part of exactly one image region, and four image regions (A, B, C, and D) are present.

The example of FIGS. 3a-f is not typical of all images since the only objects present in the image are perfect rectangles that align exactly with the subdivision into four by four blocks. In general, the boundaries of objects in an image may be irregular and may cut through the small regions into which the image is subdivided (e.g. the four by four blocks of the preferred embodiment). In this case, blocks which contain portions of two or more objects may not have mean and variance which match any of these objects very well, so these blocks may not be merged into objects on either side. In some cases, a plurality of such edge-straddling blocks may be connected, in which case they may be merged together to form a thin edge region. The next section describes how such regions are handled in determining image complexity by means of a weighted count.

Figure 4A:
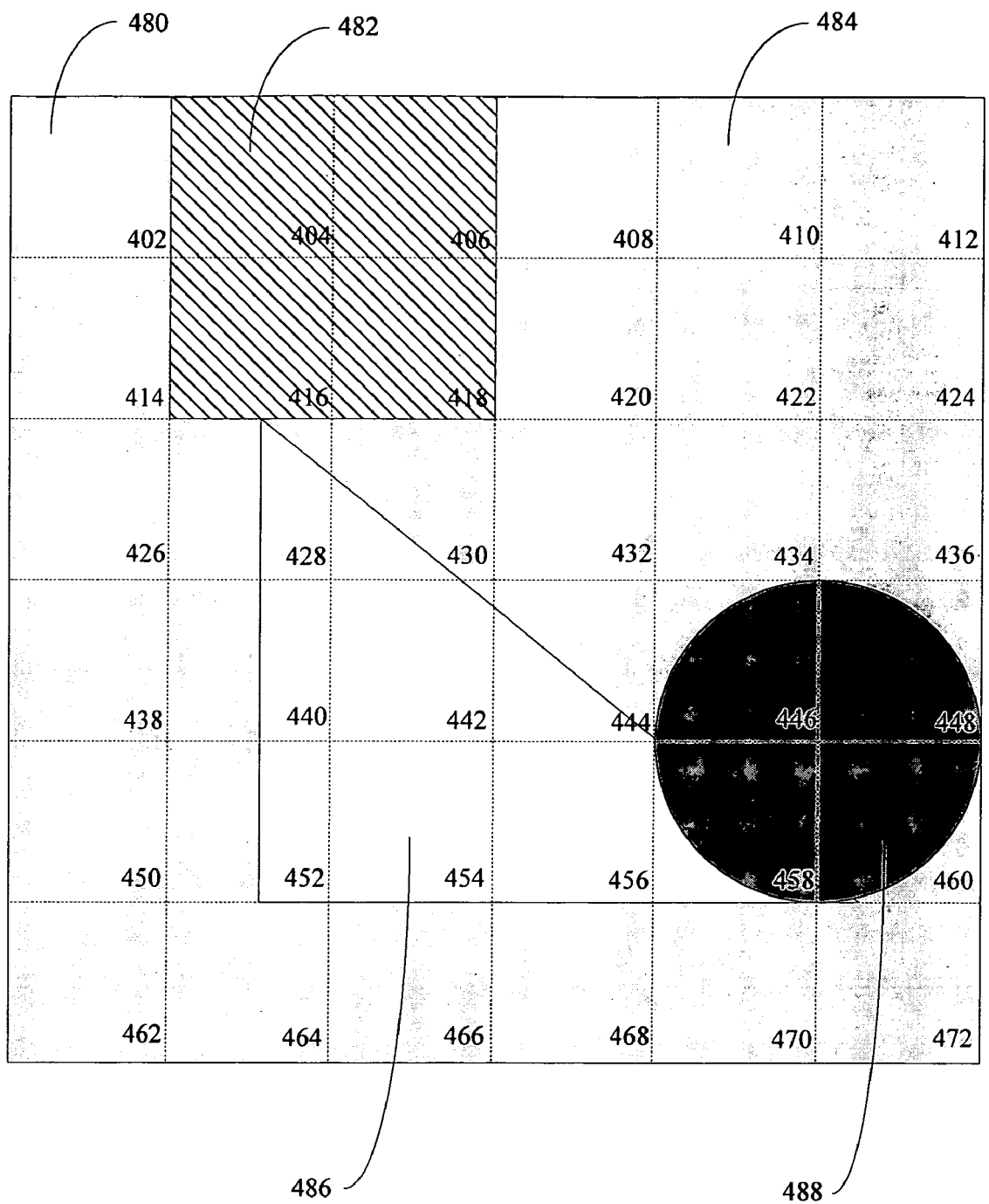
FIG. 4a illustrates a stylized image frame divided into 36 square blocks.
Figure 4B:
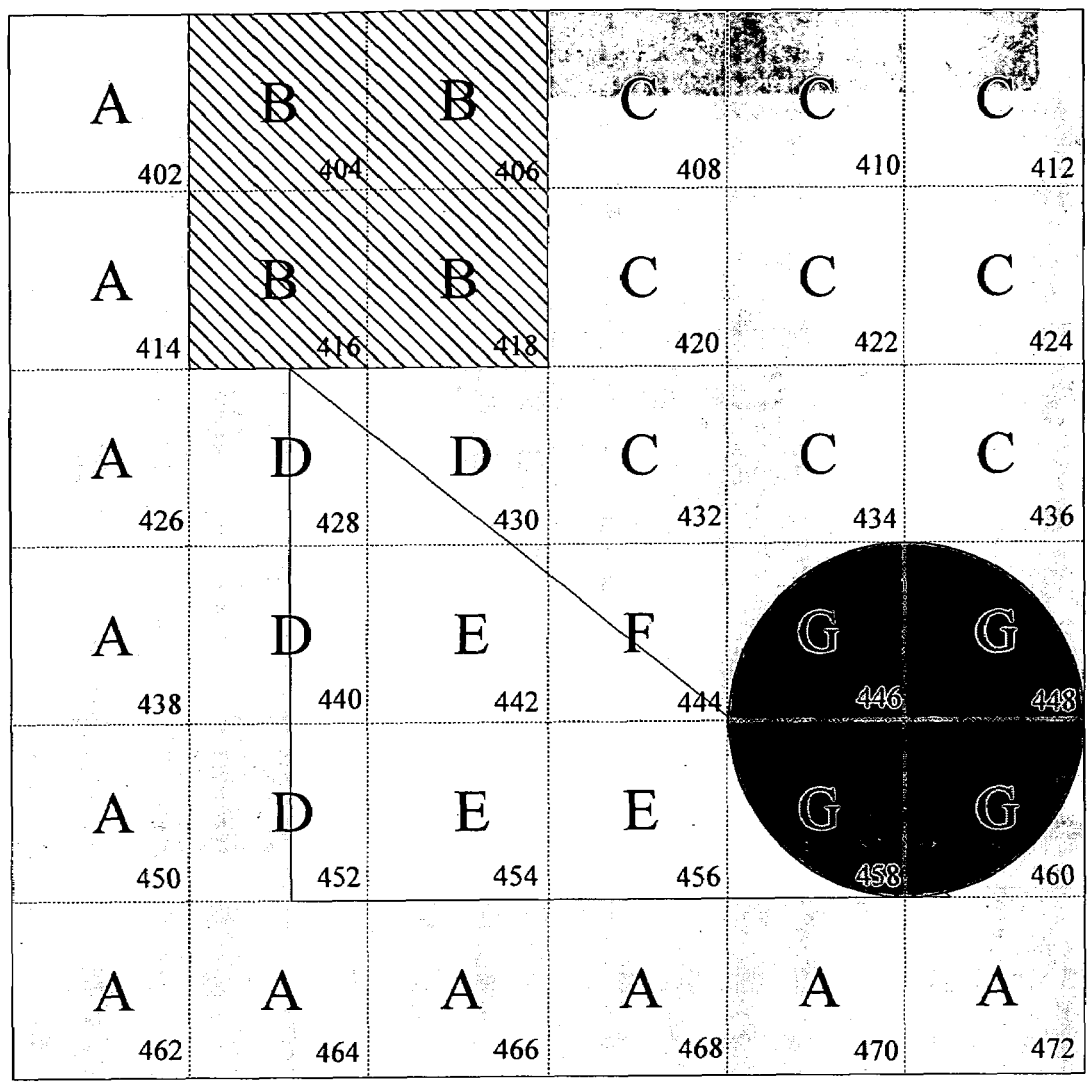
FIG. 4b illustrates the result of merging neighboring blocks according to the preferred embodiment.

FIGS. 4a-c illustrate the merging process of the preferred embodiment for another stylized image, but this image contains objects whose boundaries traverse several blocks. FIG. 4a shows five connected objects within the region: a light gray left background 480, a textured square 482, a light gray right background 484, a partially occluded white triangle 486, and a dark gray circle 488. Blocks 402-472 illustrate the initial subdivision into four pixel by four pixel blocks.

FIG. 4b illustrates the result of the merging process of the preferred embodiment after a full raster scan of blocks. Letters A through G are used to designate the resulting image regions. Note that the blocks (428, 430, 440, 452) labeled D all lie along the boundary of the triangle 486 and thus contain some white area and some light gray area. The color statistics for these blocks did not match the background region 480, the triangle 486, or the background region 484, but they were all similar to each other. Thus, a region formed along the boundary. Similarly, the block (444) labeled F lies along the boundary between triangle 486 and background 484. The color statistics for block 444 also match the statistics of the regions labeled D very closely. However, because block 430 was only compared with 432 and 442, and because block 444 was only compared to blocks below and to the right, the geometry of the merging process did not allow block 444 to merge with region D.

Note also that blocks 446, 448, and 460 in region G have identical color statistics (only the spatial characteristics are different). However, block 458 has slightly different statistics since the lesser portion of the block is white rather than light gray. Yet because the mean and variance for block 458 were sufficiently close for it to pass the first and second statistical tests with block 446, block 458 was also merged with region G. Similar reasoning explains why block 442 was merged with block 454 and 456 to form region E.

FIG. 4c illustrates the seven regions resulting from the merging process, with the original image coloring suppressed and with region boundaries highlighted. Note that these seven regions form a course division of the entire image into objects, but the objects do not perfectly match the original objects seen in FIG. 4a, and in fact extraneous regions were introduced. While the effect is greatly exaggerated here by enlargement, the merging process may allow such imperfections. Such imperfections are tolerated because, as described above, the merging process is designed for efficient, rapid estimation of image-wide complexity and not for accurate segmentation. The problem of over-counting stemming from extra regions along object boundaries is solved by a special weighted counting procedure.

2.2 Weighted Counting

As described above, the disclosed merging process may cause extraneous edge regions to form. However, these extraneous regions can generally be characterized in two ways: quite often they are very small, and quite often they have high variances due to the presence of color data from distinct objects. As a result, the present invention weights the regions formed during the merging process and then sums the weights to arrive at a complexity measure.

In one embodiment, regions above a threshold size are assigned weights of 1. Size is determined by the area of the region and also by the aspect ratio (width versus length) of the region. Regions below the threshold size are potentially assigned lower weights, depending upon their variances. A region that is below the threshold size and that has variance above a threshold level is assigned a lower weight (e.g. 0.5). In another embodiment, a plurality of size and variance thresholds and a plurality of attendant weights are contemplated.

In another embodiment, weights for regions depend only on region area. In still another embodiment, weights for regions depend on their aspect ratios so that the count for long but very thin regions is reduced. In yet another embodiment, weights for regions depend more generally on the geometry of the regions, where geometry may include the area, length, width, aspect ratio, shape, perimeter, or other geometric quantities.

The weights for each region in the image are summed to produce a final measure of the complexity of the image. This complexity measure provides an estimate of the number of distinct objects in the image, which can be used for a variety of purposes, including but not limited to determining appropriate threshold levels for a detailed segmentation process.

2.3 Method Flow Chart

Figure 5:
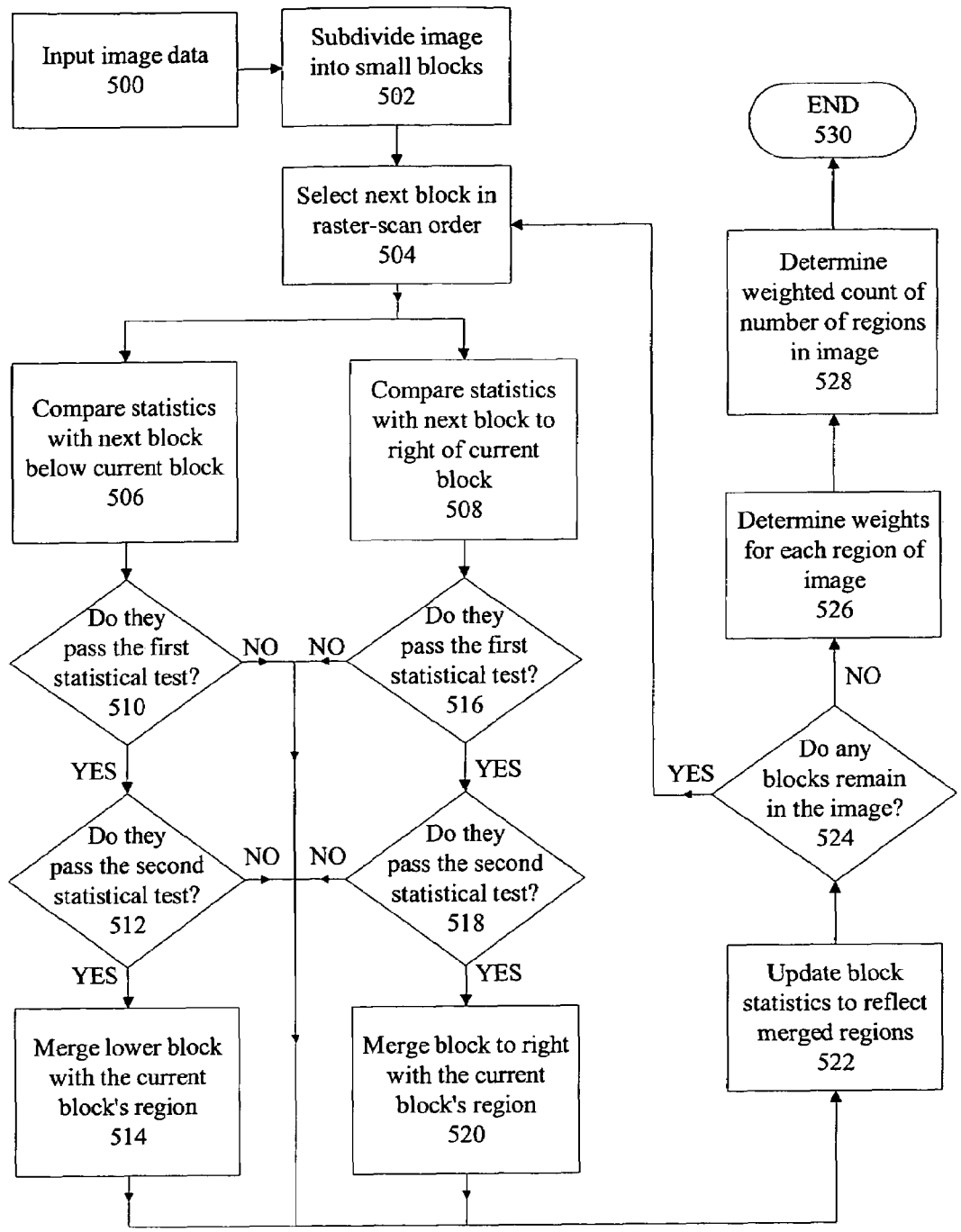
FIG. 5 is a flow chart describing a method for measuring image complexity in the preferred embodiment.

FIG. 5 is a flow chart describing the method for measuring image complexity in the preferred embodiment of the invention. In a first step 500 data for the image is input. In a next step 502, the image is subdivided into a plurality of small blocks. In a next step 504, the next block in the image is selected in raster scan order. The selected block will be referred to as the current block.

In a next step 506, the mean and variance statistics for the current block are compared with the statistics for the block immediately below the current block. In step 510, it is determined whether this pair of blocks passes the first statistical test. If not, then proceed to step 522 described below. If the answer is yes, then in step 512 it is determined whether this pair of blocks passes the second statistical test. If the answer is no, then proceed to step 522. If the answer is yes, then in step 514 the two blocks are merged and labeled as part of the same region.

Independently from step 506, in step 508 the mean and variance for the current block are compared with the statistics for the block immediately below the current block. In step 516, it is determined whether this pair of blocks passes the first statistical test. If not, then proceed to step 522 below. If the answer is yes, then in step 518 it is determined whether this pair of blocks passes the second statistical test. If the answer is no, then proceed to step 522. If the answer is yes, then in step 520 the two blocks are merged and labeled as part of the same region.

Steps 506 and 508 and their ensuing decision steps are independent and may be carried out in parallel. In case both pairs of blocks are merged, all three blocks should be labeled as part of a single region. In case no block to the right of or below the current block exists, then the relevant branch of the flow chart (beginning with 506 or 508) is by-passed. It is implicit that if the current block has already merged with one or the other of the neighboring blocks, then again the relevant branch of the flow chart is by-passed and the process proceeds to step 522.

In step 522, the mean and variance statistics are updated for any newly merged regions. The statistics for each block within a merged region should reflect the mean and variance of the whole region. No change is necessary for blocks that were not merged.

In step 524, the process determines whether any blocks remain in the image, proceeding in raster-scan order. If the answer is yes, the process loops back to step 504 and carries out the same steps for the next block. If the answer is no, then in step 526 the process determines a weight for each region in the image. As described above, weights depend on region size and region variance. In step 528, the weights for the regions are summed to produce a weighted count of the number of regions in the image. This weighted count is the image complexity measure. The process for the present image then ends 530.

As discussed above, a variety of other embodiments of the invention are consistent with the teachings of this disclosure. The steps included in the above description of the preferred embodiment should thus not be interpreted as limiting the invention.

2.4 Complexity Measuring Apparatus

Figure 6:
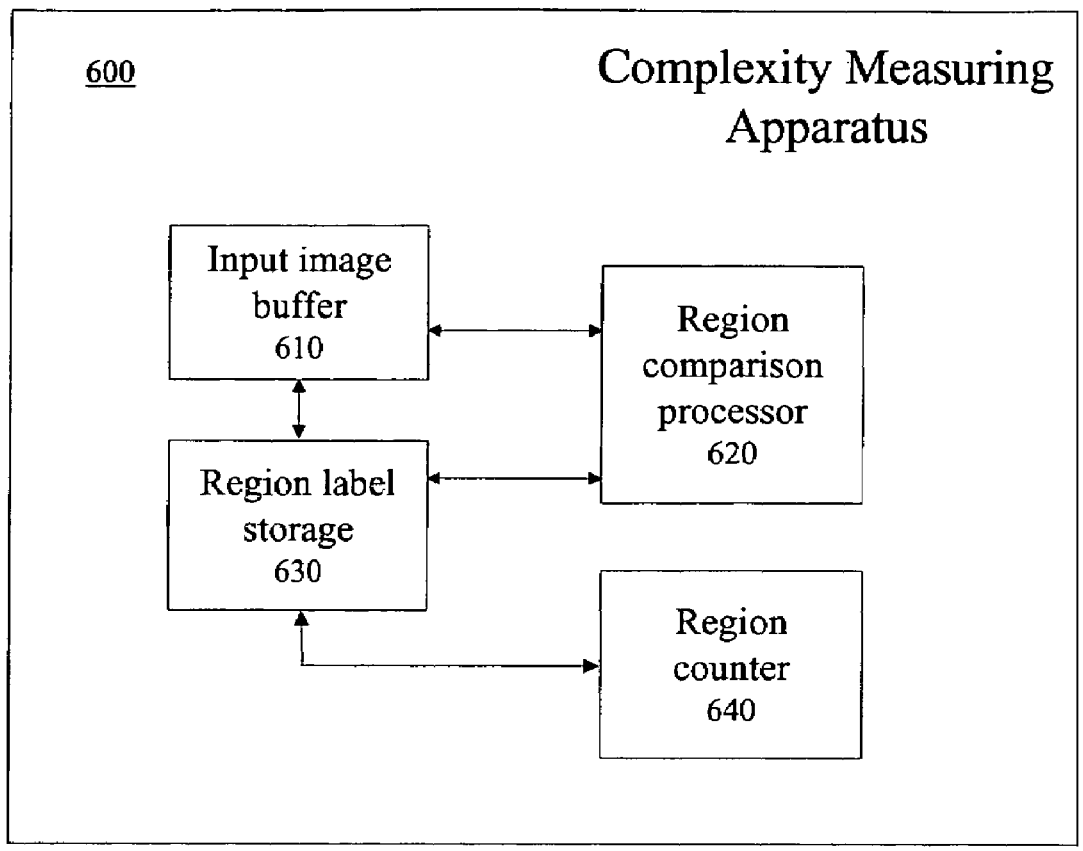
FIG. 6 is a block diagram describing the parts of a complexity measuring apparatus.

FIG. 6 illustrates a complexity measuring apparatus 600 that is designed to carry out the method disclosed above.

An input image buffer 610 stores the pixel data for an image. For instance, in a preferred embodiment the input frame buffer 610 stores the Y component of the color value for each pixel in the image. In another embodiment the input frame buffer 610 might store the Y, U, and V color components for each pixel in the image.

A region comparison processor 620 divides the image into a plurality of regions and compares the color statistics for adjacent regions. For instance, in the preferred embodiment the region comparison processor divides the image into four pixel by four pixel blocks, calculates the mean and variance for the Y component values of the pixels in each block, and uses these statistics to carry out the statistical tests. The region comparison processor 620 may compare different pairs of adjacent blocks either serially or in parallel. For instance, in the preferred embodiment the processor may proceed through the image blocks in raster order and compare each block to the neighbors to its right and below. The region comparison processor 620 determines whether to merge each pair of adjacent regions.

A region label storage 630 stores information about the regions to which each block or (sub-) region belongs. This information is updated whenever the region comparison processor 620 merges two regions together. In the preferred embodiment, the region label storage 630 takes the form of an image mask, with a label identifying the region to which each pixel belongs.

A region counter 640 performs a weighted count of the regions that are stored in the region label storage 630 after all merges have occurred. The weights may for instance vary according to region size and region variance.

These features acting in concert allow the complexity measuring apparatus 600 to perform the method for measuring image complexity described above.

2.5 Video Encoding and Decoding System

Figure 7:
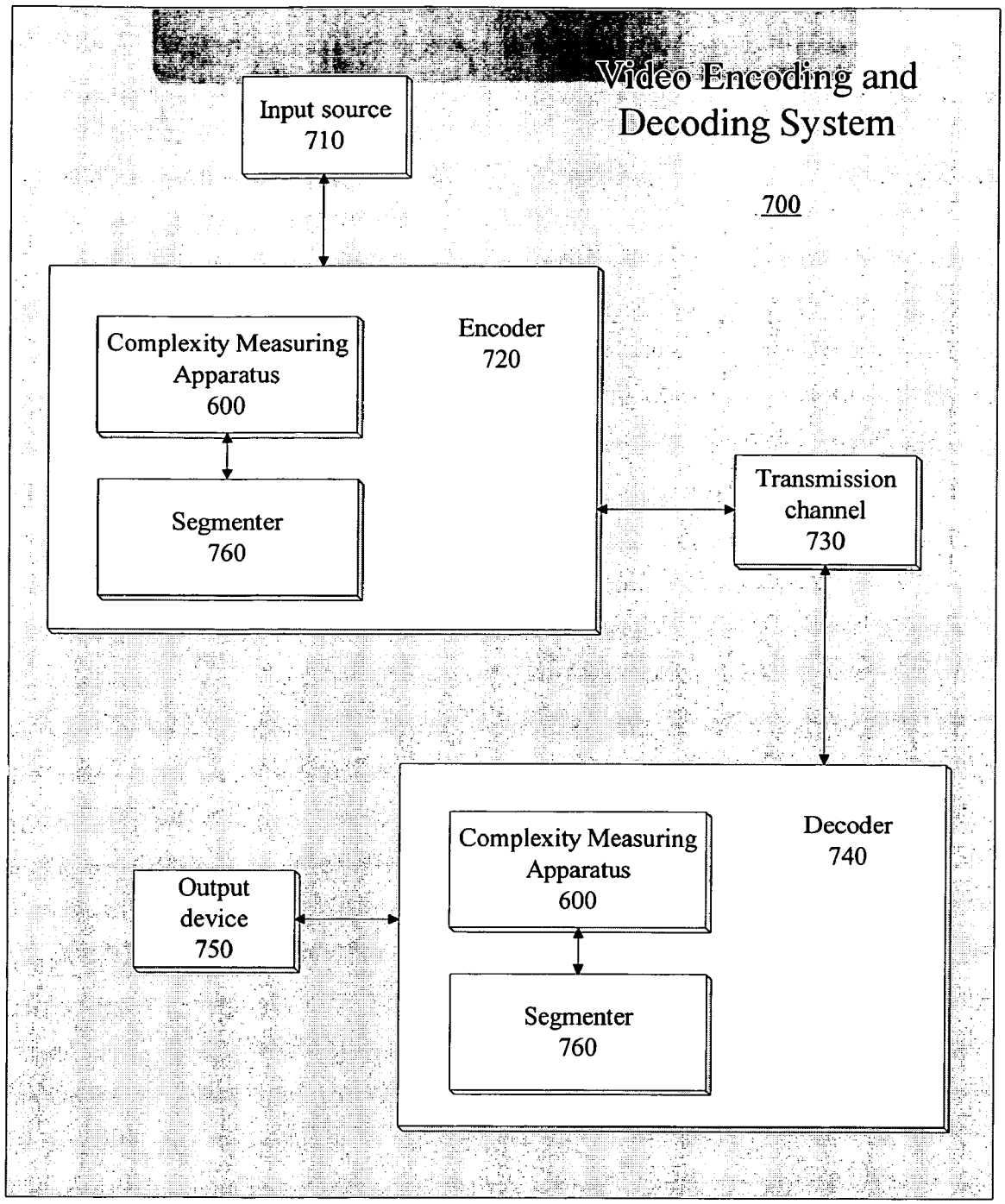
FIG. 7 is a block diagram of a system for encoding and decoding video data including the complexity measuring apparatus of the present invention.

FIG. 7 illustrates the broad structure of a video encoding and decoding system 700 that uses a segmentation-based approach. This system preferably divides frames into segments in both an encoder 720 and a decoder 740 so that only motion information and not segment structure needs to be included in an encoded bit stream.

An input source 710 provides a raw video signal to an encoder 720. The encoder 720 includes a complexity measuring apparatus 600 and a segmenter 760. The complexity measuring apparatus 600 provides a measure of image complexity for image frames in the video sequence that is used to guide the segmentation performed by the segmenter 760. The encoder 720 outputs an encoded bit stream via a transmission channel 730. The transmission channel 730 transmits the bit stream to the decoder 740, which preferably also includes a complexity measuring apparatus 600 and a segmenter 760. The complexity measuring apparatus 600 measures image complexity for image frames in the decoded video sequence, and this measure is used to guide the segmentation performed by the segmenter 760. The decoder 740 outputs a reconstructed video sequence, which may be displayed on an output device 750.

3 Conclusion Ramifications, and Scope

The present invention uses an optimized, speedy region-merging process followed by weighted region counting to determine a measure of image complexity. The specific merging process, the concept of weighted region counting for accurate object counting, and the combination of these ideas for measuring image complexity all distinguish the invention from the related art. Among other applications, this image complexity measure provides a valuable guide in choosing thresholds for performing accurate image segmentation. As such, the present invention provides a significant improvement to segmentation-based image and video compression schemes.

Reference throughout this specification to "one embodiment" or "an embodiment" or the like means that a particular feature, structure, or characteristic described in connection with the embodiment is included in at least one embodiment of the present invention. Thus, the appearances of the phrases "in one embodiment" or "in an embodiment" or the like in various places throughout this specification are not necessarily all referring to the same embodiment. Furthermore, the particular features, structures, or characteristics may be combined in any suitable manner in one or more embodiments.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of determining a measure of image complexity, the method comprising:
    subdividing an image into a plurality of small image regions;
    performing multiple statistical tests to determine the similarity of at least one pair of adjacent image regions; and
    grouping the at least one pair of adjacent image regions together into one new region if said pair passes the multiple statistical tests, wherein the multiple statistical tests include a test of whether the adjacent image regions have a ratio of max $(\sigma_1^2, \sigma_2^2)$ divided by $\min(\sigma_1^2, \sigma_2^2)$ is less than a threshold value, wherein $\sigma_1^2$ and $\sigma_2^2$ comprise the variances of the adjacent image regions.

2. The method of claim 1, further comprising:
    iterating said steps of performing the multiple statistical tests for pairs of adjacent image regions and grouping the pairs of image regions that pass the multiple statistical tests until no remaining pairs of adjacent image regions in the image pass the multiple statistical tests.

3. The method of claim 2, further comprising:
    making a weighted count of the resulting image regions, where weights depend on a geometrical characteristic of the image regions.

4. The method of claim 1, wherein the multiple statistical tests include a test of whether the adjacent image regions are determined to have sufficiently similar variances in their data.

5. The method of claim 4, wherein the adjacent image regions are determined to have sufficiently similar variances if a statistical f-test is passed.

6. The method of claim 1, wherein the multiple statistical tests further include a test of whether data for the adjacent image regions have sufficiently similar means in their data.

7. The method of claim 6, wherein the adjacent image regions are determined to have sufficiently similar means if a statistical t-test is passed.

8. The method of claim 1, wherein the multiple statistical tests include both a statistical f-test and a statistical t-test.

9. The method of claim 1, wherein the method is used to guide segmentation of an image into arbitrarily-shaped regions.

10. A device for processing an image frame, the device comprising:
    a complexity measuring apparatus configured to subdivide the image frame into a plurality of small image regions, perform multiple statistical tests to determine the similarity of at least one pair of adjacent image regions; and group the at least one pair of adjacent image regions together into one new region if said pair passes the multiple statistical tests, wherein the multiple statistical tests include a test of whether the adjacent image regions have a ratio of max $(\sigma_1^2, \sigma_2^2)$ divided by $\min(\sigma_1^2, \sigma_2^2)$ that is less than a threshold value, wherein $\sigma_1^2$ and $\sigma_2^2$ comprise the variances of the adjacent image regions.

11. The device of claim 10, further comprising:
    an image segmenter configured to receive a measure of complexity of the image frame from the complexity measuring apparatus.

12. A system for encoding and decoding image frames of a video sequence, the system comprising:
    an encoder for encoding the image frame of the video sequence including at least a complexity measuring apparatus and an image segmenter; and
    a decoder for receiving an encoded bit stream from the encoder and configured to reconstruct the video sequence therefrom,
    wherein the complexity measuring apparatus is configured to subdivide the image frame into a plurality of small image regions, perform multiple statistical tests to determine the similarity of at least one pair of adjacent image regions; and group the at least one pair of adjacent image regions together into one new region if said pair passes the multiple statistical tests, wherein the multiple statistical tests include a test of whether a ratio of max $(\sigma_1^2, \sigma_2^2)$ divided by $\min(\sigma_1^2, \sigma_2^2)$ that is less than a threshold value, wherein $\sigma_1^2$ and $\sigma_2^2$ comprise the variances of the adjacent image regions.

* * * * *